Patented Dec. 11, 1923.

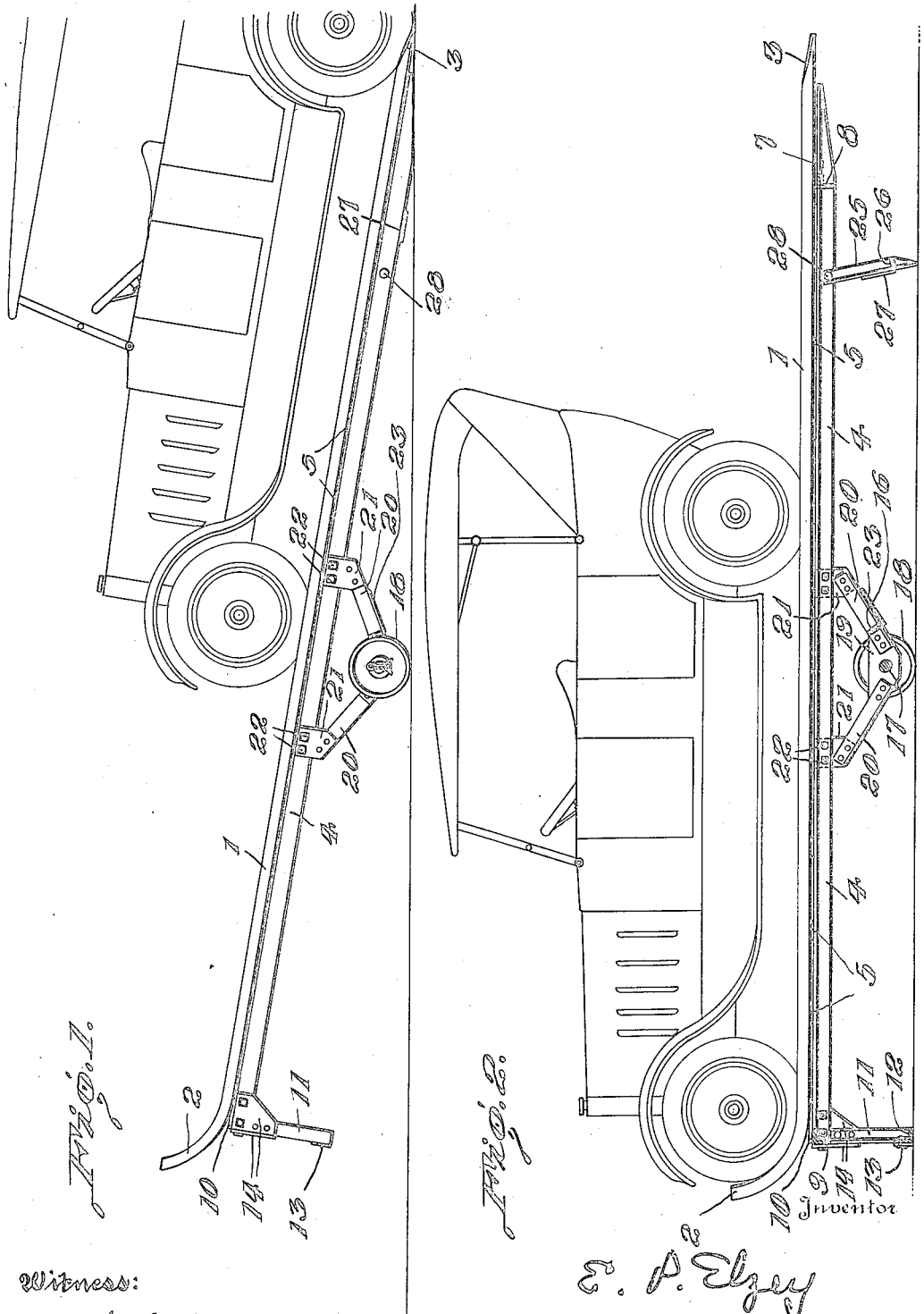

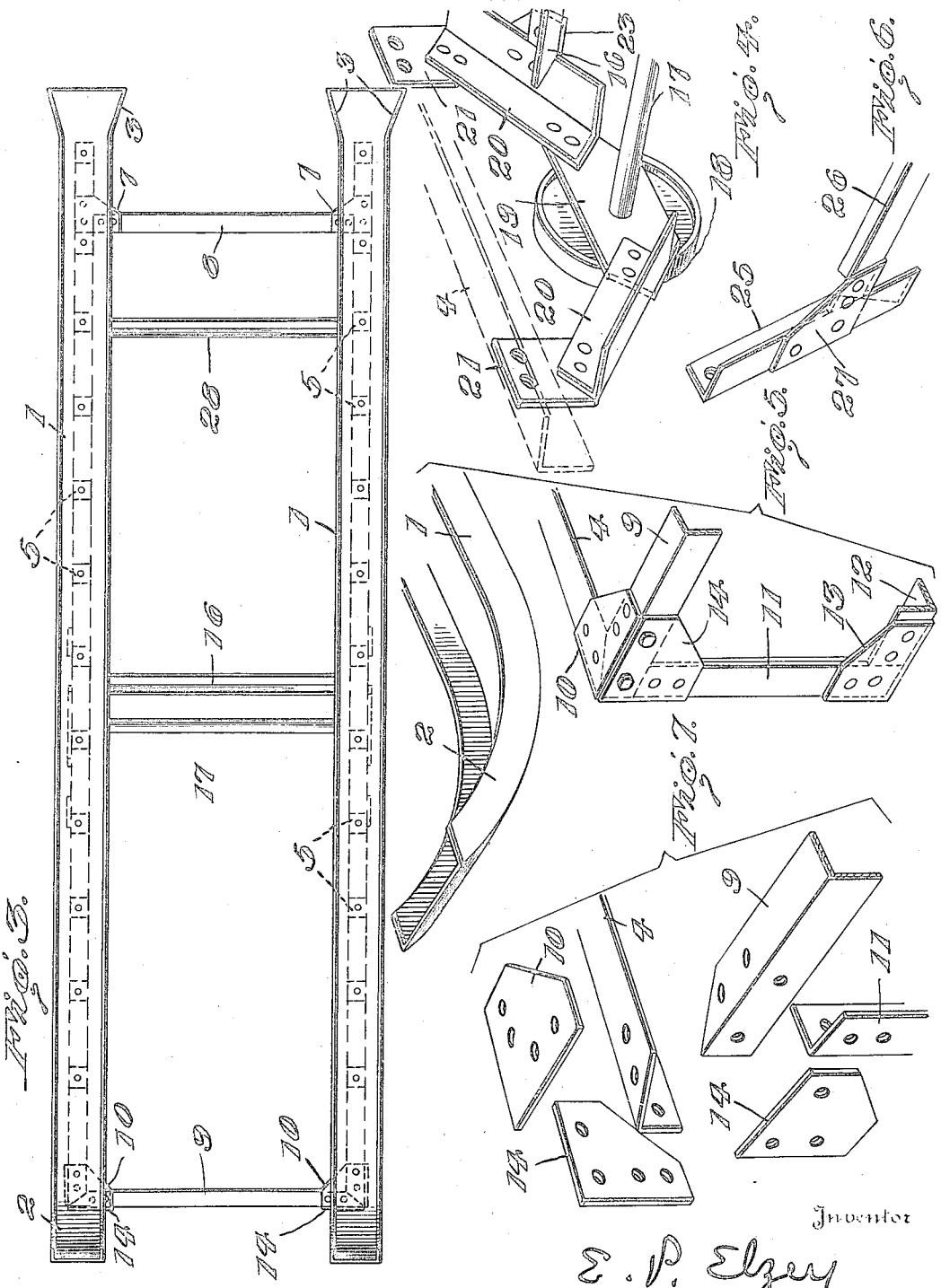

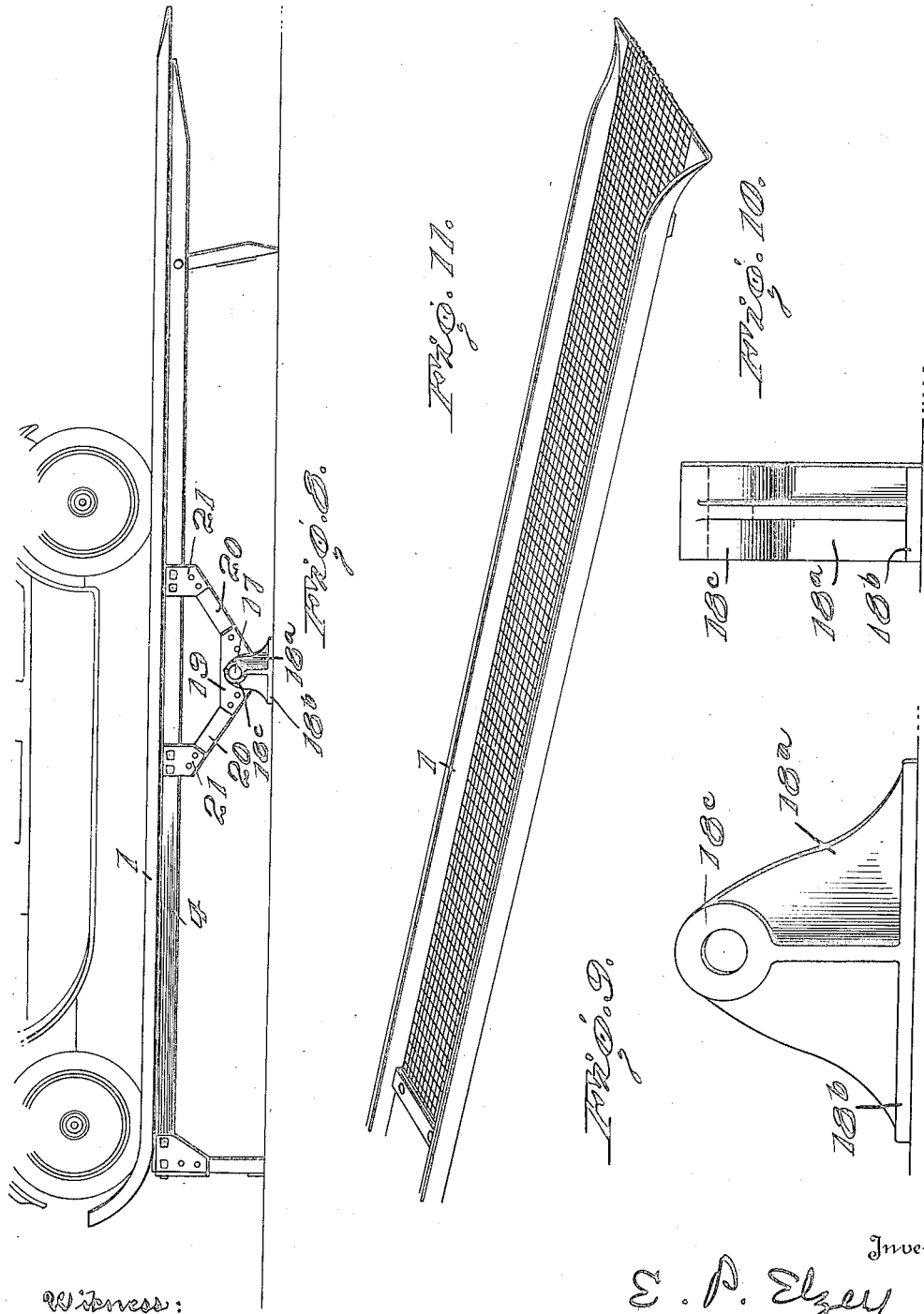

1,477,332

UNITED STATES PATENT OFFICE.

EDGAR P. ELZEY, OF PARKERSBURG, WEST VIRGINIA.

ELEVATING TRUCK OR CRADLE FOR MOTOR VEHICLES.

Application filed November 30, 1921. Serial No. 518,933.

*To all whom it may concern:*

Be it known that I, EDGAR P. ELZEY, a citizen of the United States of America, and a resident of Parkersburg, county of Wood, State of West Virginia, have invented certain new and useful Improvements in and Relating to Elevating Trucks or Cradles for Motor Vehicles, of which the following is a specification.

This invention relates to certain improvements in elevating trucks or cradles for motor vehicles and the like, and the objects and nature of the invention will be readily understood by those skilled in the art in the light of the following explanation of the accompanying drawings illustrating what I now believe to be the preferred mechanical expression or embodiment of my invention from among other forms, constructions and arrangements within the spirit and scope thereof.

It is an object of this invention to provide a truck or cradle of improved construction capable of holding and supporting a motor car in an elevated or horizontal position in such manner that ample room is provided below the car for inspection of and access to parts below the vehicle body for so-called "under car" work; and to provide such truck or cradle of a skid-like type by the provision of long stiff channel irons to enable the vehicle to move longitudinally thereof in traveling up onto and down from the same; and to render such truck or cradle tiltable in such manner that the vehicle moving longitudinally and forwardly on the long unbroken channel irons from the floor or ground will automatically tilt the truck to horizontal position holding the vehicle elevated for inspection, and so that the elevated vehicle moving longitudinally and rearwardly on the horizontally arranged truck will cause tilting of the truck to inclined or skid position with the ends of the unbroken bars engaging the floor to permit travel of the vehicle therefrom onto the floor or ground.

With these and other objects in view my invention consists in certain novel features of construction and in combinations and arrangements as more fully and particularly set forth and specified hereinafter.

Referring to the accompanying drawings:

Fig. 1 is a side elevation of a truck or cradle constituting an embodiment of my invention, the truck being shown in skid position with a motor traveling longitudinally thereof to or from the ground.

Fig. 2 is a longitudinal section of the truck of Fig. 1, showing the same in horizontal or vehicle elevating position.

Fig. 3 is a top plan view of the truck.

Figs. 4, 5, 6, and 7, are detail views.

Fig. 8 is a side elevation of the truck equipped with ground supports formed by foot or pivot blocks instead of ground wheels.

Figs. 9 and 10 are detail views of said blocks.

Fig. 11 is a detail perspective of a portion of a wheel track channel.

In garages and motor vehicle repair shops, it is common practice to provide so-called pits which are in fact excavations in the ground, to enable mechanics to get under motor cars driven onto fixed supports extending across the pits for performing so-called under car work. Waste oil and gasoline as well as heavy fumes accumulate in such pits thereby rendering them a source of danger. Furthermore, the pits take up valuable space, are permanently located, as well as being objectionable for other reasons.

According to my invention, a vertically tiltable, preferably portable, longitudinally-elongated platform is provided of sufficient width to receive a motor car and of a length far greater than the length of any motor car the platform is intended to receive. This platform is provided with means to stop the forward progress of a motor car on the platform and also with a front depending leg or support to engage the ground or floor and aid in upholding the platform and the car thereon in a horizontal elevated position. Intermediate its length, the platform has a depending support to rest on the ground or floor and provide the fulcrum or rocker on which the platform is vertically tiltable. This rocker support or fulcrum is preferably equipped with ground wheels by which the platform is rendered portable, i. e., by which the platform can be transported or wheeled from place to place.

The stiff straight or approximately flat elongated platform projects a suitable distance rearwardly beyond the intermediate rocker or fulcrum support and said rear portion constitutes a free overhanging rear end which is preferably overloaded to cause the platform to normally assume a tilted, inclined, or the so-called skid position, with the free end of the platform resting on the ground or floor and the front end of the platform and its depending leg or support elevated a distance above the floor. When the platform is in this skid position, a motor car can be driven (or drawn) from the ground or floor, longitudinally onto the platform. As the car travels up the platform, the point will be reached where the weight of the front part of the car over balances the rear part of the platform and the load thereon, and causes the platform to automatically tilt to horizontal position with the front leg or support resting on the floor and the car held in elevated horizontal position. The front stop prevents forward movement of the car on the platform beyond the point desired. The platform is open so that mechanics can easily get under the platform and car with free access to under parts of the car.

The platform can be restored to skid position, and the car to the floor, by causing the elevated horizontal car to slowly travel longitudinally on the platform toward the free or overhanging rear end thereof, whereupon the platform will automatically tilt until its rear end rests on the ground or floor so that the car will travel therefrom onto the floor and leave the platform.

In the particular example illustrated, the platform embodies a pair of parallel spaced longitudinally elongated motor car wheel rail held relatively fixed in spaced relation, in this instance comprising channel bars 1 to form depressed tracks, for motor car wheels. These channel bars form flat bottom troughs to receive the car wheels, each trough throughout its length having upstanding flanges along both sides or edges to serve as guards confining the car wheels in the trough and against lateral movement therefrom. The front ends of the channels are curved upwardly to form horns 2, constituting an efficient stop limiting the forward movement of the motor car along the channels and confining the car against forward movement from the truck.

The rear ends of the channels are preferably free and at their under sides formed to rest on the ground or floor in such manner as to enable the motor car wheels to travel freely from the ground or floor up longitudinally onto the top surfaces of the channels.

The upstanding flanges or side guards 2 of each free rear channel end are preferably flared or bent outwardly in opposite directions to provide flaring or wheel guiding entrances 3 to the wheel rails or troughs and to protect the wheel tires. These two wheel rails 1 are rigid and preferably straight throughout their lengths except for the front stop horns 2, and preferably constitute a part of the rigid framework of the truck, which embodies longitudinal beams and rigid cross connections.

In the present instance, I provide a rectangular open stiff strong longitudinal framework on which said channels 1 are fixed. This framework comprises relatively narrow parallel longitudinal angle bars 4 located below and longitudinally of the channels 1, respectively, and fixedly united thereto at frequent intervals by vertical rivets 5. The relatively wide flat horizontal webs or floors of the channels 1 are parallel with and above the horizontal top flanges of the angle bars 4 to which they are riveted so that the vertical flanges of the angle bars depend from the channels approximately throughout the lengths thereof to stiffen and brace the framework.

The two longitudinal sills thus formed (in this example, each composed of a channel bar and an angle bar riveted together) are rigidly secured together in parallel spaced relation by any suitable means, although in the example illustrated, I show the two longitudinal sills secured together at their front and rear portions by stiff cross connections composed of angle bars and gusset or bracing plates. For instance, horizontal plates 7 are riveted on the top flanges of the rear portions of the longitudinal angle bars 4, respectively, so as to project laterally therefrom into the open space between the two side sills, and an angle-iron cross bar 8 is riveted to and connects said two plates 7. The two gusset plates 7 are preferably inserted between the bottom faces of the channels 1 and the horizontal top flanges of the angle bars 4, and are secured by vertical rivets extending through the floors of the channels, the plates and the horizontal angles of bars 4, although I do not wish to so limit my invention. In the particular example illustrated, the cross bar 8 fits under the projecting ends of plates 7 and is riveted thereto with the cross bar end edges abutting the inner longitudinal edges of the top flanges of bars 4, although I do not wish to so limit my invention.

Also, in the particular embodiment shown, the rear ends of the bars 4 terminate short of the rear ends of the channels 1, with the depending flanges of the bars 4 longitudinally tapered off at the rear ends of said bars, to permit the rear ends of the floors of the channels to rest on the floor when the truck is in skid position, see Fig. 1, although I do not wish to so restrict my invention.

A rigid cross connection is provided between the front ends of the side sills and also a strong rigid depending front supporting leg. In this example, the front rigid cross connection comprises angle iron cross bar 9 at its ends abutting the front ends of bars 4 and riveted to horizontal corner or gusset plates 10. These plates 10 fit on the top flanges of the front ends of plates 4 and are riveted thereto and also fit on the top flange of cross bar 9 and cover the corners and the joints between cross bar 9 and bars 4. The channels 1 can also rest on plates 10 and be riveted thereto. In this example, the front leg or support consists of fixedly united angle bars 11, 12, and gusset plates 13, 14. The horizontal foot or ground engaging cross bar 12 abuts the two upright end bars 11 and is fixedly united thereto by flat vertical gusset or corner plates 13 riveted to the bars and covering the joints between the same. Two vertical angularly arranged corner or gusset plates 14 are riveted to the upper ends of each upright bar 11 and project upwardly therefrom to fit the corners of the main framework. In other words, the plates 14 extend up beside the vertical outer faces of the main frame bars 9, 4, and are rigidly secured to said bars of any suitable means to render the front depending support or leg a strong rigid part of the main framework. For convenience in assembling and knocking down the truck, I can if so desired, rigidly yet detachably secure the front leg to the main framework by bolts such as 15, see particularly Fig. 5. Where this plan is followed, the main framework will be fabricated as a complete unit, and the front leg will be fabricated as another complete unit, and both will be punched to receive the bolts 15.

The intermediate or fulcrum support of the truck can be constructed in any suitable manner, although in the specific example illustrated, I show a pair of similar vertical side frames at their upper ends rigidly secured to the side sills of the truck and depending therefrom and rigidly secured together by cross bar 16, and at their lower portions providing transverse alined holes for a transverse shaft or axle 17, at its outer ends having ground or supporting wheels 18 confined thereon and located at the outer sides of the depending side frames. The particular form of side frame disclosed, comprises a central vertical bottom plate 19 (see particularly Fig. 4) that receives the axle 17 and from which inclined angle bars 20 diverge upwardly. The lower ends of the bars 20 are riveted to the opposite end portions of said plates 19 and lie against a vertical face thereof. Vertical plates 21 are riveted to the widely spaced upper ends of bars 20, and project vertically therefrom to extend upwardly beside the vertical flange of one of the framework bars 4 to which said plates 21 are rigidly fixed, by any suitable means, such as bolts 22. If so desired, for ease in assembling and in knocking down the truck, each side frame can be fabricated as a separate complete unit. They can then be assembled by rigidly securing the cross bar 16 to corresponding inclined bars 20 by the frames through the medium of bolts 23. The axle 17 can then be inserted and the wheels 18 applied. The intermediate or fulcrum support can then be as a unitary structure, rigidly secured to the main framework as a part of the truck by applying the bolts 22, although I do not wish to so limit the broad features of my invention.

It will be noted that the side frames to a certain extent serve as trusses in bracing the main framework and in providing an exceedingly strong fulcrum or intermediate support, whereby the truck rocks or tilts on the longitudinal axial line of the axle 17 as a fulcrum or axis, also the wheels 18 constitute means whereby the truck can be conveniently rolled or transported from one location to another.

If so desired, a folding leg or support can be provided to steady the overhanging or free rear end of the truck when in horizontal or vehicle elevating position. For instance, I show such a folding or swinging leg composed of a pair of parallel upright angle bars 25 rigidly connected together by cross bar 26 and connecting plates 27 all riveted together (see particularly Fig. 6) with the upper ends of bars 25 having transverse holes at their upper ends to receive a pivot bolt or bolts 28 by which the swinging leg is pivotally united to the rear portion of the framework in advance of the rear cross connection 8. The upper ends of the bars 25 of the swinging leg extend up at the inner sides of the vertical flanges of framework bars 4 and the removable pivot 28 transversely passes through said flanges and the upper ends of said end bars of the leg so that the leg can drop down to operative position, see Fig. 2, or can fold up against the top flanges of bars 4, out of the way, see Fig. 1. Any suitable hook, chain, or other detachable connection can be applied to frame bar 8 and cross bar 26 of the leg to hold the leg in folded position.

If so desired, the floors of the channels 1, particularly the rear end portions thereof, can be provided with a roughened or other wheel engaging surface to increase the traction and reduce slipping of the vehicle wheels in the channels as might occur should the channels be exposed to rain, snow or sleet. For instance, the floors of the channels can be roughened or rendered irregular in various ways to reduce possibility of the wheels slipping or spinning thereon, although I show lengths 30 of strong heavy wire cloth or netting on the floors of the channels 1, and riveted or otherwise fixed thereto.

Usually the truck equipment includes foot blocks $18^a$ to be substituted for ground wheels 18 where it is possible or desirable to permanently locate the truck; where it is not desirable to shift or transport the truck from place to place on the ground wheels 18. The wheels 18 and foot blocks 18ª are preferably interchangeable, i. e., the wheels 18 can be removed from the axle 17 and the blocks 18ª substituted therefor, or vice versa.

In the example disclosed, each foot block consists of a forging or casting having an elongated more or less wide flat base 18ᵇ to rest on the floor or ground and provide an ample footing. The block rises from the base and at its upper end is formed with a transverse hub 18ᶜ, the bore of which receives and provides an ample bearing for the end of axle 17. Where the blocks are used, the truck will tilt on the axle as an axis or fulcrum line as it does when the wheels constitute the ground support.

The particular example illustrated, is light in weight and construction when considered in the light of the work to be performed, and yet is exceedingly strong and durable, due to the so-called bridge construction employed. In this example, the truck is composed of stock structural steel parts, excepting the wheels or foot blocks and axle, and can be produced at comparatively low cost. However, I do not wish to so limit the broad features of my invention.

It is evident that various changes, modifications and variations might be resorted to without departing from the spirit and scope of my invention, and hence I do not wish to limit myself to the exact disclosures hereof notwithstanding the foregoing detailed descriptions which have been presented merely for purposes of explanation and clearness with respect to what I now believe to be the preferred embodiment.

What I claim is:

1. A motor vehicle elevating truck vertically rockable to and from skid position and horizontal elevated position, said truck embodying a longitudinally elongated vehicle supporting and skid forming platform provided with longitudinal channel bars rigid throughout their lengths and providing vehicle wheel trackways, the floors of said trackways having relatively-fixed reticular traction surfaces.

2. A motor vehicle elevating truck vertically rockable to and from skid position and horizontal elevated position, said truck embodying a longitudinally elongated vehicle supporting and skid forming platform, said platform comprising a framework longitudinally open to permit an operator on the floor to reach or extend through the framework below a vehicle held elevated thereby, said framework including longitudinal side sills providing vehicle wheel trackways said trackways having wire mesh wheel tread surfaces.

3. A motor vehicle elevating cradle comprising elongated longitudinal sills stiff throughout their lengths providing channels forming longitudinal depressed top runways for the vehicle wheels with front end wheel stops, and supporting means for said sills constructed and arranged to cause said sills to automatically rock from inclined position to elevated horizontal position under the shifting weight of a motor vehicle traveling upwardly and forwardly in said channels and to automatically rock from elevated horizontal position to inclined position with the rear ends of the sills resting on the floor under the shifting weight of the motor vehicle moving rearwardly in said channels to travel from the rear ends thereof onto the floor, said means embodying fixed legs depending from the front ends of the sills and rigidly connected together and fixed side supports rigidly connected together and depending from intermediate portions of the sills with the overhanging end portions of the sills extending rearwardly beyond said side supports.

4. A motor vehicle elevating cradle comprising separated opposite-side longitudinal sills embodying channel bars forming top depressed vehicle wheel runways, said channel bars bent upwardly at their front ends to form wheel stops, and supporting and spacing connecting means for said sills, said sills having fixed rigid depending front end and intermediate supports and stiff straight overhanging end portions projecting rearwardly beyond the supporting means, said front end and intermediate supports constructed and arranged to support and uphold the sills and the motor vehicle thereon in horizontal elevated position and to cause the sills to automatically rock from horizontal to inclined position with their overhanging ends engaging the floor, by the shifting weight of the motor vehicle while traveling under its own power rearwardly along said elevated horizontal channel bars, and to cause the sills to rock from inclined position to horizontal position and to thereby automatically elevate the vehicle to and support the same in horizontal position, by the shifting weight of the vehicle traveling under its own power from the floor forwardly up and along said channel bars.

5. A motor vehicle elevating cradle constructed and arranged to automatically rock under the shifting weight of the vehicle to and from elevated horizontal position and inclined position with its rear resting on the floor and to automatically elevate the vehicle to horizontal position by the shifting weight of the motor vehicle traveling under its own power from the floor upwardly along the cradle, said cradle comprising elongated rigidly-spaced and connected longitudinal sills stiff throughout their lengths, the cradle being open between the sills, said sills embodying top longitudinal channel bars providing depressed top runways for the vehicle wheels and longitudinal flanged bars on which said channel bars are fixed, a rigid front support fixed to and depending from the front ends of the sills and carried thereby, and an intermediate support on which the cradle is rockable depending from and secured to said sills intermediate the lengths thereof, the straight stiff rear portions of the sills being overhanging and extending rearwardly from said intermediate support.

6. A motor vehicle elevating truck of the type substantially as described, comprising spaced rigidly connected longitudinal sills each embodying a bottom longitudinal angle bar and a top channel bar fixed on the upper side of the angle bar, and front end and intermediate depending supports lapping and secured to the depending flanges of the angle bars.

7. A motor vehicle elevating truck vertically rockable on a transverse axis, and comprising a pair of spaced rigidly connected longitudinal sills having longitudinal upstanding edge flanges and forming depressed traction tracks for the motor vehicle wheels, said sills being unbroken throughout their lengths, a rigid U-shaped front leg depending from and fixed to and connecting the front ends of the sills, sill supporting truss-forming side frames fixed to and depending from the intermediate portions of the sills and rigidly connected together and embodying angle irons, a cross shaft between and carried by said side frames, and floor engaging supporting means carrying said shaft.

8. A motor vehicle elevating portable cradle constructed and arranged to automatically lock under the shifting weight of the vehicle to and from elevated horizontal position and inclined position with its rear resting on the floor and to automatically elevate the vehicle to horizontal position by the shifting weight of the motor vehicle traveling under its own power from the floor upwardly along the cradle, said cradle comprising elongated rigidly-spaced and connected longitudinal sills stiff throughout their lengths, the cradle being open between the sills, said sills embodying longitudinal channel bars providing depressed top runways for the vehicle wheels, a rigid front support fixed to and depending from the front ends of the sills and carried thereby and embodying vertical end bars at their upper ends fixed to the sills and a cross bar rigidly connecting their lower ends, and an intermediate support on which the cradle is rockable depending from and secured to said sills intermediate the lengths thereof, the straight stiff rear portions of the sills being overhanging and extending rearwardly from said intermediate support, whereby the sills and vehicle are supported in elevated horizontal positions by said front and intermediate supports, and the sills and vehicle traveling thereon are supported in inclined position by the rear ends of the sills engaging the floor and the intermediate support.

9. A motor vehicle elevating portable cradle constructed and arranged to automatically rock under the shifting weight of the vehicle to and from elevated horizontal position and inclined position with its rear resting on the floor and to automatically elevate the vehicle to horizontal position by the shifting weight of the motor vehicle traveling under its own power from the floor upwardly along the cradle, said cradle comprising elongated rigidly-spaced and connected longitudinal sills stiff throughout their lengths, the cradle being open between the sills, said sills embodying top longitudinal channel bars providing depressed top runways for the vehicle wheels, a rigid front support fixed to and depending from the front ends of the sills and carried thereby, and an intermediate support having floor engaging supporting means and on which the cradle is rockable depending from and secured to said sills intermediate the lengths thereof, the straight stiff rear portions of the sills being overhanging and extending rearwardly from said intermediate support, said intermediate support embodying upright side frames and a fixed cross connection between the frames, each frame embodying plates and upwardly diverging truss-forming bars.

EDGAR P. ELZEY.